(12) United States Patent
Starzynski

(10) Patent No.: US 9,784,758 B2
(45) Date of Patent: Oct. 10, 2017

(54) RESONATING BEAM ACCELEROMETER

(71) Applicant: Honeywell International Inc., Morristown, NJ (US)

(72) Inventor: John S. Starzynski, North Bend, WA (US)

(73) Assignee: Honeywell International Inc., Morris Plains, NJ (US)

( * ) Notice: Subject to any disclaimer, the term of this patent is extended or adjusted under 35 U.S.C. 154(b) by 73 days.

(21) Appl. No.: 14/691,431

(22) Filed: Apr. 20, 2015

(65) Prior Publication Data

US 2015/0268267 A1 Sep. 24, 2015

Related U.S. Application Data

(60) Division of application No. 13/451,449, filed on Apr. 19, 2012, now Pat. No. 9,009,947, which is a continuation of application No. 12/751,157, filed on Mar. 31, 2010, now Pat. No. 8,176,617.

(51) Int. Cl.
*G01P 15/097* (2006.01)
*G01P 15/08* (2006.01)

(52) U.S. Cl.
CPC ........ *G01P 15/097* (2013.01); *G01P 15/0802* (2013.01); *Y10T 29/42* (2015.01); *Y10T 29/49002* (2015.01); *Y10T 29/49005* (2015.01); *Y10T 29/49007* (2015.01); *Y10T 29/4908* (2015.01)

(58) Field of Classification Search
CPC ........................... G01P 15/097; G01P 15/0802
USPC ............................. 73/514.01, 514.29, 514.34
See application file for complete search history.

(56) References Cited

U.S. PATENT DOCUMENTS

| 4,881,408 A | * | 11/1989 | Hulsing, II | ........... G01P 15/097 73/514.12 |
| 4,901,570 A | * | 2/1990 | Chang | ................... G01P 15/097 73/514.29 |
| 4,939,935 A | | 7/1990 | Amand | |
| 5,115,291 A | * | 5/1992 | Stokes | ................ G01P 15/0802 257/438 |
| 5,176,031 A | | 1/1993 | Peters | |

(Continued)

OTHER PUBLICATIONS

Schmidt, "Water-to-Water Bonding for Microstructure Formation," Proceedings of the IEEE, vol. 86, No. 8, Aug. 1998.

(Continued)

*Primary Examiner* — Helen Kwok
(74) *Attorney, Agent, or Firm* — Shumaker & Sieffert, P.A.

(57) ABSTRACT

A method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time. One or more damping plates are created from a quartz material. A direct bond is formed between the damping plates and the proof mass device. The proof mass device is created by applying a predefined amount of pressure at pressure at temperature to two bases, two proof mass portions, and a flexure. The proof mass bases are on opposite sides of the flexure. The proof mass portions are on opposite sides of the flexure. A gap is present between the proof mass bases and the proof mass portions.

14 Claims, 2 Drawing Sheets

(56) References Cited

U.S. PATENT DOCUMENTS

| | | | |
|---|---|---|---|
| 5,315,874 A * | 5/1994 | Petrovich | G01P 15/0802 310/348 |
| 5,596,145 A | 1/1997 | Albert et al. | |
| 5,644,081 A | 7/1997 | Schwarz et al. | |
| 5,644,083 A | 7/1997 | Newell et al. | |
| 5,656,778 A | 8/1997 | Roszhart | |
| 5,668,057 A | 9/1997 | Eda et al. | |
| 5,894,090 A | 4/1999 | Tang et al. | |
| 6,032,531 A | 3/2000 | Roszhart | |
| 6,098,460 A * | 8/2000 | Otsuchi | G01L 5/0052 310/331 |
| 6,232,150 B1 * | 5/2001 | Lin | B81C 1/00269 438/119 |
| 6,367,786 B1 | 4/2002 | Gutierrez et al. | |
| 6,553,836 B2 | 4/2003 | Williams | |
| 6,595,054 B2 | 7/2003 | Paros et al. | |
| 7,038,150 B1 * | 5/2006 | Polosky | H01H 1/0036 200/61.45 M |
| 7,655,538 B2 | 2/2010 | Sawyer | |
| 8,176,617 B2 | 5/2012 | Starzynski | |
| 8,485,032 B2 * | 7/2013 | Starzynski | G01P 15/097 73/514.01 |
| 2005/0252308 A1 * | 11/2005 | Hjelt | G01P 15/06 73/862.041 |
| 2006/0162453 A1 * | 7/2006 | Mikado | G01P 15/097 73/514.29 |
| 2007/0099410 A1 * | 5/2007 | Sawyer | B81C 1/00269 438/612 |
| 2007/0122929 A1 * | 5/2007 | Diem | B81B 7/0077 438/51 |
| 2008/0260187 A1 * | 10/2008 | Colaizzi | G10K 9/122 381/190 |
| 2009/0241665 A1 | 10/2009 | Novack | |
| 2010/0095770 A1 | 4/2010 | Hsu | |
| 2011/0049652 A1 * | 3/2011 | Wu | B81C 1/00246 257/417 |
| 2011/0132088 A1 * | 6/2011 | Jenkins | G01P 15/0802 73/514.29 |
| 2011/0159627 A1 * | 6/2011 | Mantravadi | B81C 1/00182 438/52 |
| 2012/0227495 A1 | 9/2012 | Starzynski | |

OTHER PUBLICATIONS

Examination Report from counterpart European application No. 11151766.0, dated May 26, 2011, 3 pp.

Examination Report from counterpart European application No. 11151766.0, dated Jun. 10, 2011, 5 pp.

Response to Examination Report from counterpart European application No. 11151766.0, dated Jun. 10, 2011, filed on Sep. 14, 2011, 8 pp.

Prosecution History from U.S. Pat. No. 8,176,617, dated Apr. 8, 2011 through Jan. 26, 2012, 29 pp.

Prosecution History from U.S. Appl. No. 13/451,449, dated Jan. 22, 2013 through Dec. 22, 2014, 61 pp.

* cited by examiner

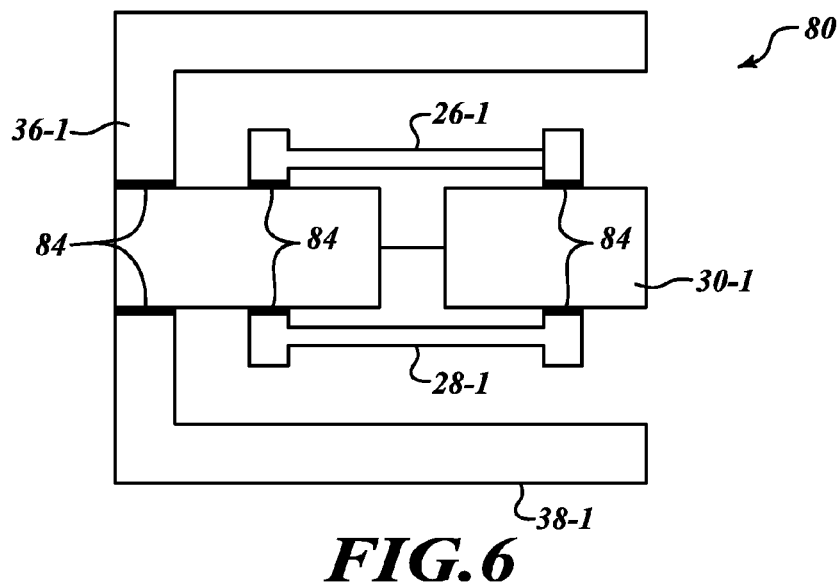
FIG. 6
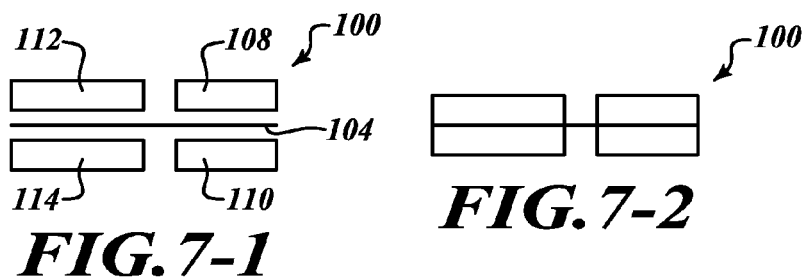
FIG. 7-1     FIG. 7-2
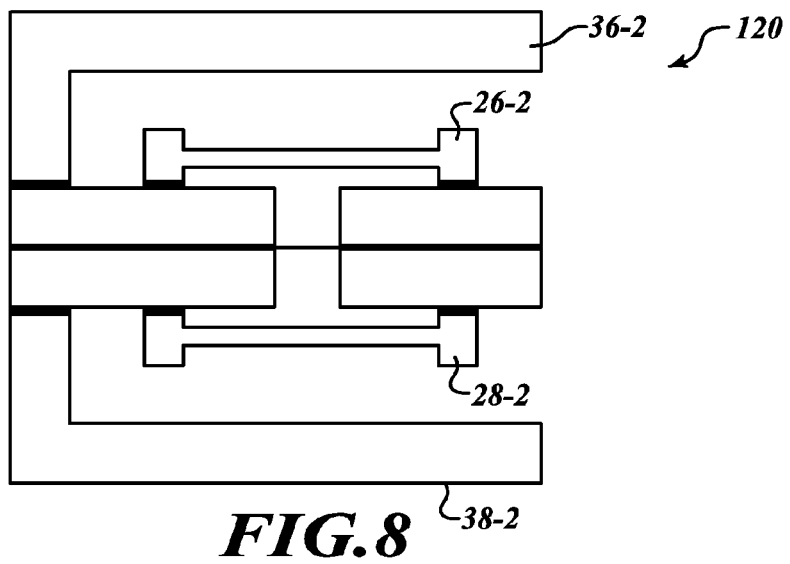
FIG. 8

RESONATING BEAM ACCELEROMETER

PRIORITY CLAIM

This application is a divisional of U.S. patent application Ser. No. 13/451,449 filed on Apr. 19, 2012, which is a continuation of U.S. patent application Ser. No. 12/751,157 filed on Mar. 31, 2010, now U.S. Pat. No. 8,176,617. The entire content of each of these applications is incorporated herein by reference.

GOVERNMENT INTEREST

The invention described herein was made in the performance of work under U.S. Government Contract No. FA9453-05-C-0241 awarded by Air Force Research Laboratories. The Government may have rights to portions of this invention.

BACKGROUND OF THE INVENTION

The sensitivity of an accelerometer can be degraded by creep of bonded joints. It can also be degraded by a difference in the coefficient of thermal expansion (CTE) between the bonding solder or glue and the bonded pieces.

The resonators and damping plates are typically attached employing either solder or glue. Glue, and to a lesser degree solder, may creep (the tendency of a solid material to slowly move or deform under the influence of stress), thus degrading the sensitivity of the accelerometer.

In addition, the sensitivity of an accelerometer can be degraded by machining imperfections in the proof mass hinge. Machining the hinge can introduce microcracking in the hinge, resulting in loss of accelerometer sensitivity and/or hinge failure.

One way to manufacture a hinge is to glue or solder a thin blank between four proof mass sections. Once again, creep of the solder or glue, as well as the CTE mismatched between the solder or the glue and the proof mass material, will degrade sensitivity.

SUMMARY OF THE INVENTION

The present invention provides a method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time.

In one aspect of the invention, one or more damping plates are created from a quartz material. A direct bond is formed between the damping plates and the proof mass device by applying a predefined amount of pressure at a predefined temperature for a predefined amount of time.

In another aspect of the invention, the proof mass device is created by applying a predefined amount of pressure at a predefined temperature for a predefined amount of time to two proof mass bases, two moveable proof mass portions, and a flexure layer, thereby forming a direct bond between the parts. The proof mass bases are located on opposing sides of the flexure layer at one end of the flexure layer. The moveable proof mass portions are located on opposing sides of the flexure layer at another end of the flexure layer. A gap is present between the proof mass bases and the moveable proof mass portions.

BRIEF DESCRIPTION OF THE DRAWINGS

Preferred and alternative embodiments of the present invention are described in detail below with reference to the following drawings:

FIGS. 2-1, 2-2 are top and side views of a proof mass used in the RBA of FIG. 1;

FIGS. 3-1, 3-2 are side and top views of a resonator that is used in the RBA shown in FIG. 1;

FIGS. 4-1, 4-2, 4-3 are side, bottom, and top views of a top damping device used in the RBA shown in FIG. 1;

FIG. 6 illustrates direct bonds of an exemplary RBA;

FIGS. 7-1, 7-2 are side views showing construction of a proof mass according to an alternate embodiment of the present invention; and FIG. 8 is a side view of an RBA incorporating the proof mass of FIG. 7-2.

DETAILED DESCRIPTION OF THE INVENTION

The present invention provides a sensitive resonating beam accelerometer (RBA) and a method for making a sensitive RBA, RBAs measure acceleration as a function of the frequency difference between two sets of vibrating quartz beams.

Figure 1:
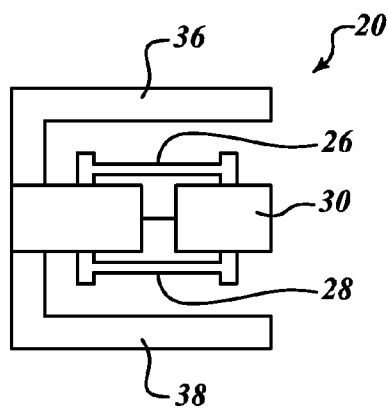
FIG. 1 is a side cross-sectional view of a resonating beam accelerometer (RBA) formed in accordance with an embodiment of the present invention.

As shown in FIG. 1, an exemplary RBA 20 includes two sets of resonators 26, 28, a hinged proof mass 30, and two damping plates 36, 38. The damping plates 36, 38 damp out the oscillation of the proof mass 30. All the components are manufactured from the same type of material typically fused silica (amorphous quartz) or single crystal quartz.

Figures 1, 2:
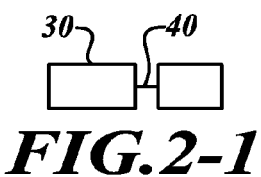
Figure 2:
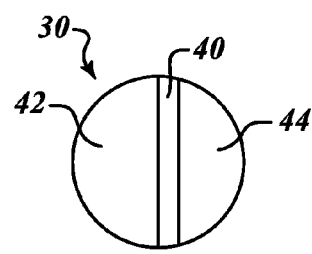
Figures 1, 3:
Figures 2, 3:
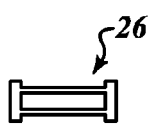
Figures 1, 4:
Figures 2, 4:
Figures 3, 4:
Figure 5:
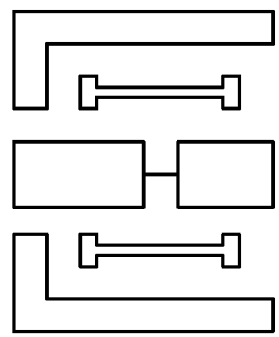
FIG. 5 is an exploded view of the RBA of FIG. 1.

FIGS. 2-1, 2-2 are top and side views of the proof mass 30. FIGS. 3-1, 3-2 are top and side views of the top set of resonators 26. FIGS. 4-1 4-2, 4-3 are top, bottom, and side views of the top damping plate 36. FIG. 5 is an exploded view of the RBA 20.

The proof mass 30 includes a thinned region 40 that spans across two thicker portions 42, 44. The thinned region 40 acts as a bending point (flexure) for the end portions 42, 44 of the proof mass 30. The resonators 26, 28 are attached, perpendicular to the hinge, between each of the portions 42, 44 of the proof mass 30. The damping plates 36, 38 are attached to both the top and bottom sides of the stationary portion 42 of the proof mass 30. When the RBA 20 experiences an acceleration force, the movable portion 44 of the proof mass 30 will bend and one set of the resonators 26, 28 will increase in frequency and the other set will decrease in frequency. The magnitude of the acceleration is determined by these frequency changes.

Prior to assembly of the RBA components, the joining surfaces are polished. The parts are polished using standard mechanical glass polishing techniques, Then the surfaces are cleaned in a solution containing water, hydrogen peroxide, and ammonium hydroxide and then dried. The components are placed and held together at a predefined pressure of between 0.2 and 40 atmospheres with tooling (not shown) and heated to a temperature above 200° C. for several hours. Atoms from the components will interdiffuse and form a direct bond. This bond will not creep and if the joined parts are of the same material, there will be no CTE mismatch between the bond and the joined pieces. Direct bonding allows for joining of two materials without an intermediate layer as in soldering or gluing. The direct bond of two similar single-crystal materials results in the crystal lattices being joined together.

As shown in FIG. 6, an RBA 80 has been assembled using direct bonding. Damping plates 36-1, 38-1 and resonators 26-1, 28-1 are direct bonded to a proof mass 30-1 according to the process described above. Direct bonds 84 now exist between the parts.

FIGS. 7-1 and 7-2 show exploded and assembled views of a proof mass 100 fabricated with direct bonding. The proof mass 100 includes five pieces: a hinge layer 104, between 0.001 to 0.010 inches thick; two proof mass ends 108, 110 between 0.050 to 0.250 inches thick; and two proof mass bases 112, 114 between 0.050 to 0.250 inches thick. The proof mass 100 is created by applying the direct bonding technique described above. The result is a direct bond created between the ends 108, 110, and bases 112, 114, and the hinge 104.

As shown in FIG. 8, an RBA 120 is assembled by employing direct bonding using the proof mass 100 shown in FIG. 7-2. Damping plates 36-2, 38-2 and resonators 26-2, 28-2 are direct bonded to the proof mass 100. The highlighted lines indicate where direct bonds occur.

An example process for performing a direct bond includes placing the resonators, damping plates and proof mass into a tooling device that keeps all the parts in proper position. The tooling device also allows for pressure 10-50 lbs/in$^2$ to be applied between the parts. Then, temperature is raised over a two hour period to 450°, held at 450° for eight hours, then lowered to room temperature the last two hours. Only pressures and temperatures may be used in order to affect direct bonds to occur between like materials.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A resonating beam accelerometer (RBA) device, the device comprising:
   two proof mass bases;
   two moveable proof mass portions; and
   a flexure layer,
   wherein one of the two proof mass bases is directly bonded to a first side of a first end of the flexure layer at least by atoms interdiffused between the one of the two proof mass bases and the flexure layer and the other of the two proof mass bases is directly bonded to a second side of the first end of the flexure layer at least by atoms interdiffused between the other of the two proof mass bases and the flexure layer,
   wherein one of the two moveable proof mass portions is directly bonded to a first side of a second end of the flexure layer at least by atoms interdiffused between the one of the two moveable proof mass portions and the flexure layer and the other of the two moveable proof mass portions is directly bonded to a second side of the second end of the flexure layer at least by atoms interdiffused between the other of the two moveable proof mass portions and the flexure layer,
   wherein a gap is present between the proof mass bases and the moveable proof mass portions, and
   wherein respective coefficient of thermal expansions (CTEs) of the two proof mass bases, respective CTEs of the two moveable proof mass portions, and respective CTEs of the flexure layer are within a threshold amount of each other.

2. The device of claim 1, wherein the respective CTEs of the two proof mass bases, the respective CTEs of the two moveable proof mass portions, and the respective CTEs of the flexure layer are identical.

3. The device of claim 1, wherein the respective CTEs of the two proof mass bases, the respective CTEs of the two moveable proof mass portions, and the respective CTEs of the flexure layer are within a threshold amount of each other such that there is no CTE mismatch at respective direct bonds between the two proof mass bases, the two moveable proof mass portions, and the flexure layer.

4. The device of claim 1, wherein the respective CTEs of the two proof mass bases, the respective CTEs of the two moveable proof mass portions, and the respective CTEs of the flexure layer are substantially equal.

5. The device of claim 1, wherein the direct bonds between the two proof mass bases and the flexure layer join the two proof mass bases and the flexure layer without solder or glue.

6. The device of claim 1, wherein the direct bonds between the two moveable proof mass portions and the flexure layers join the two proof mass bases and the flexure layer without solder or glue.

7. The device of claim 1, wherein a crystal lattice of the one of the two proof mass bases and a crystal lattice of the flexure layer are joined to directly bond the one of the two proof mass bases and the flexure layer, and wherein a crystal lattice of the other of the two proof mass bases and the crystal lattice of the flexure layer are joined to directly bond the other of two proof mass bases and the flexure layer.

8. The device of claim 1, wherein a crystal lattice of the one of the two moveable proof mass portions and a crystal lattice of the flexure layer are joined to directly bond the one of the two proof mass bases and the flexure layer, and wherein a crystal lattice of the other of the two moveable proof mass portions and the crystal lattice of the flexure layer are joined to directly bond the other of the two proof mass bases and the flexure layer.

9. The device of claim 1, wherein the two proof mass bases, the two moveable proof mass portions, and the flexure layer are formed of a same material.

10. The device of claim 1, wherein the first side of the first end and the first side of the second end are a same side of the flexure layer.

11. The device of claim 1, wherein the respective CTEs of the two proof mass bases are approximately equal to each other.

12. The device of claim 1, wherein the two proof mass bases, the two moveable proof mass portions, and the flexure layer comprise a quartz material.

13. The device of claim 12, wherein the quartz material comprises at least one of amorphous quartz or single crystal quartz.

14. The device of claim 12, wherein the quartz material for each of the two proof mass bases, the two moveable proof mass portions, and the flexure layer are the same quartz material.

* * * * *